April 17, 1951      J. G. BAKER      2,549,562
POWER-DRIVEN OPERATOR
Filed April 18, 1949      4 Sheets-Sheet 1
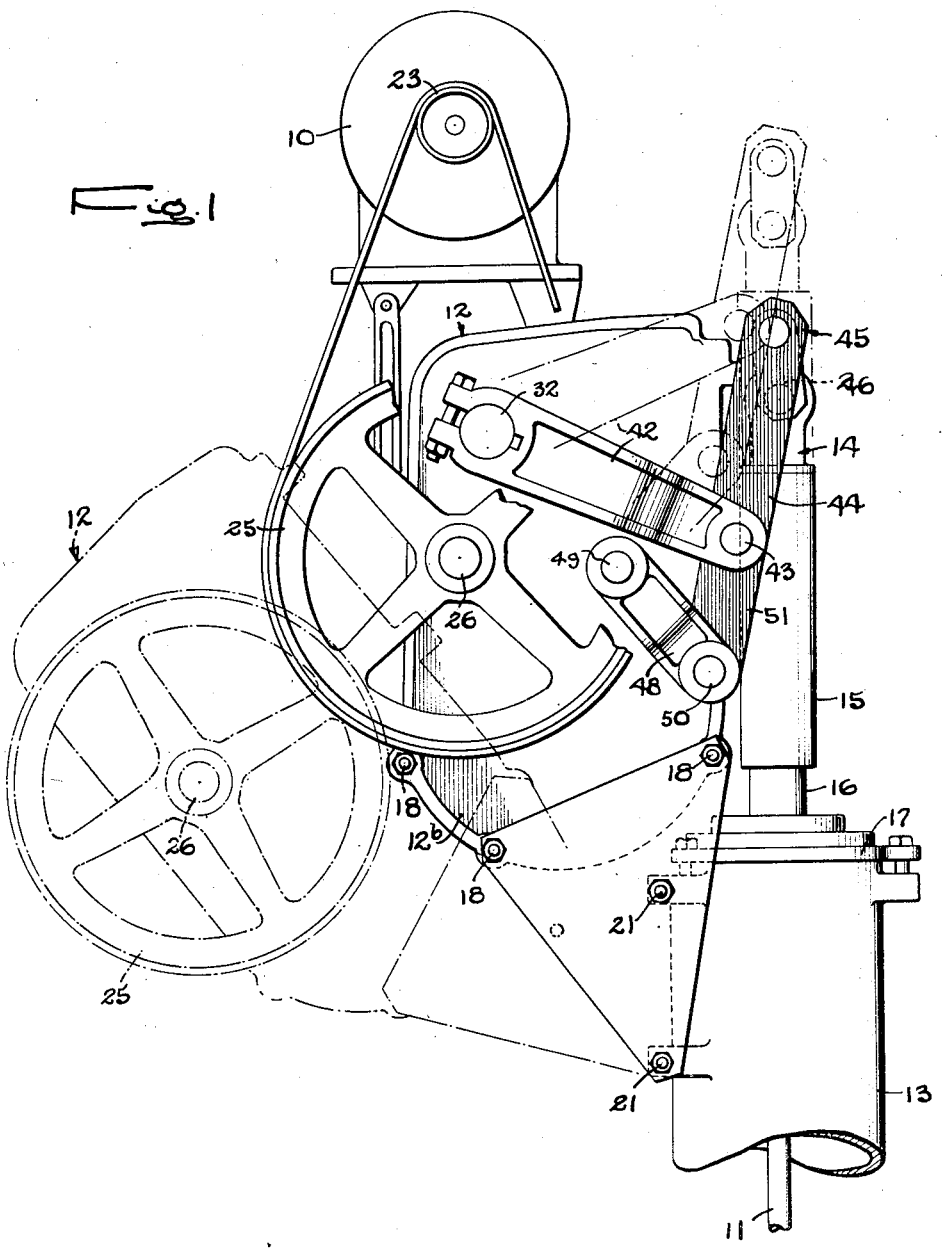
INVENTOR
John G. Baker
By Carlton, Pitzner, Hubbard & Wolfe
ATTORNEYS

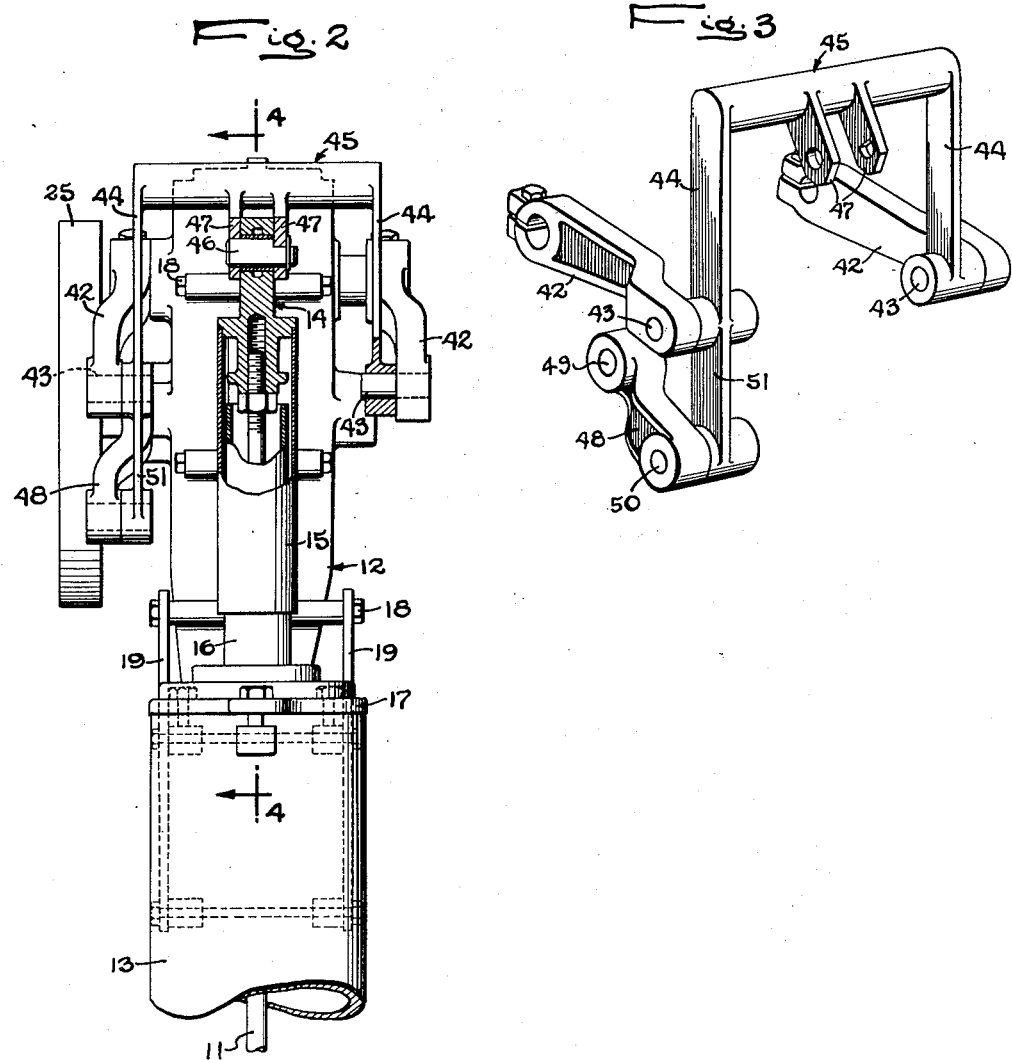

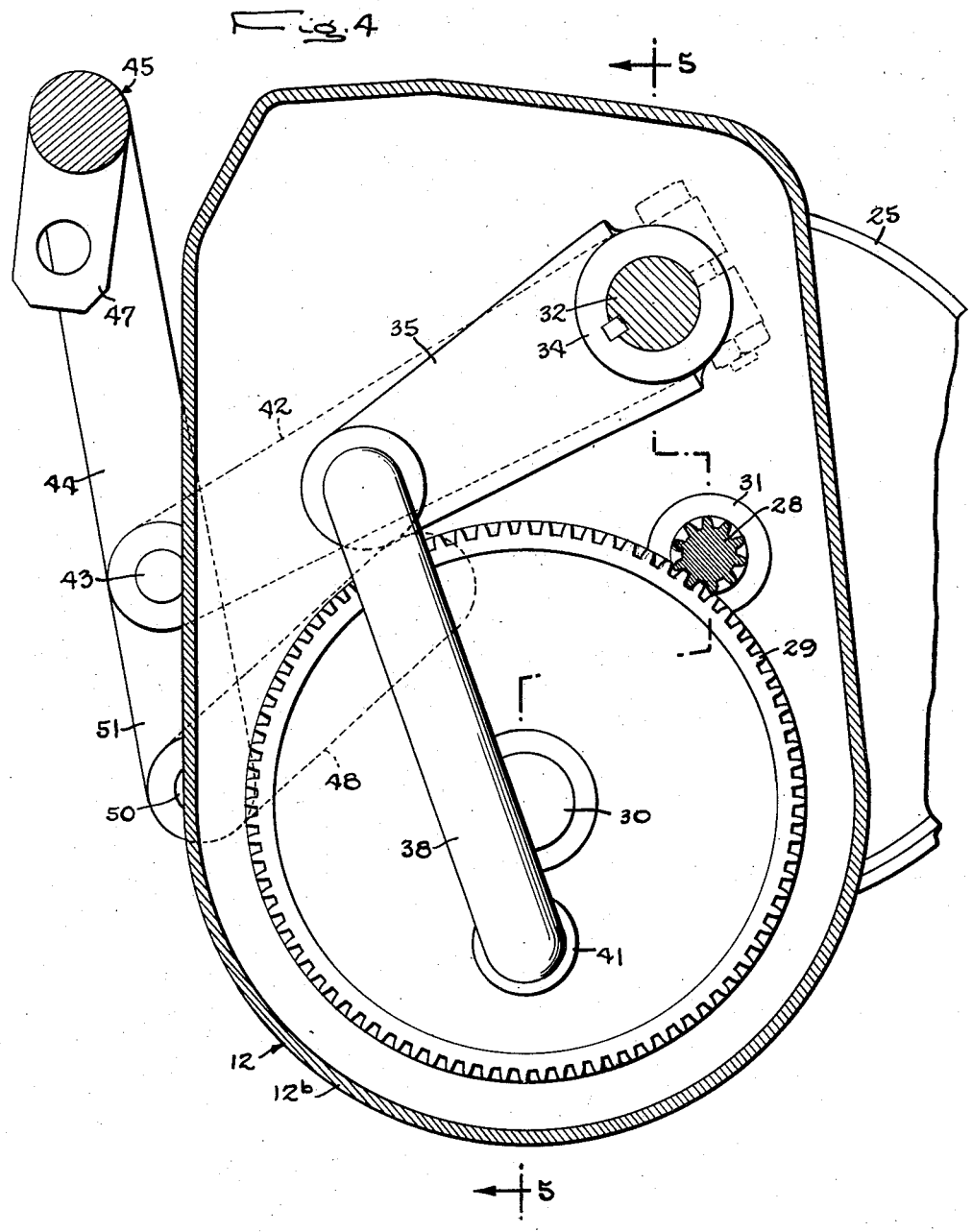

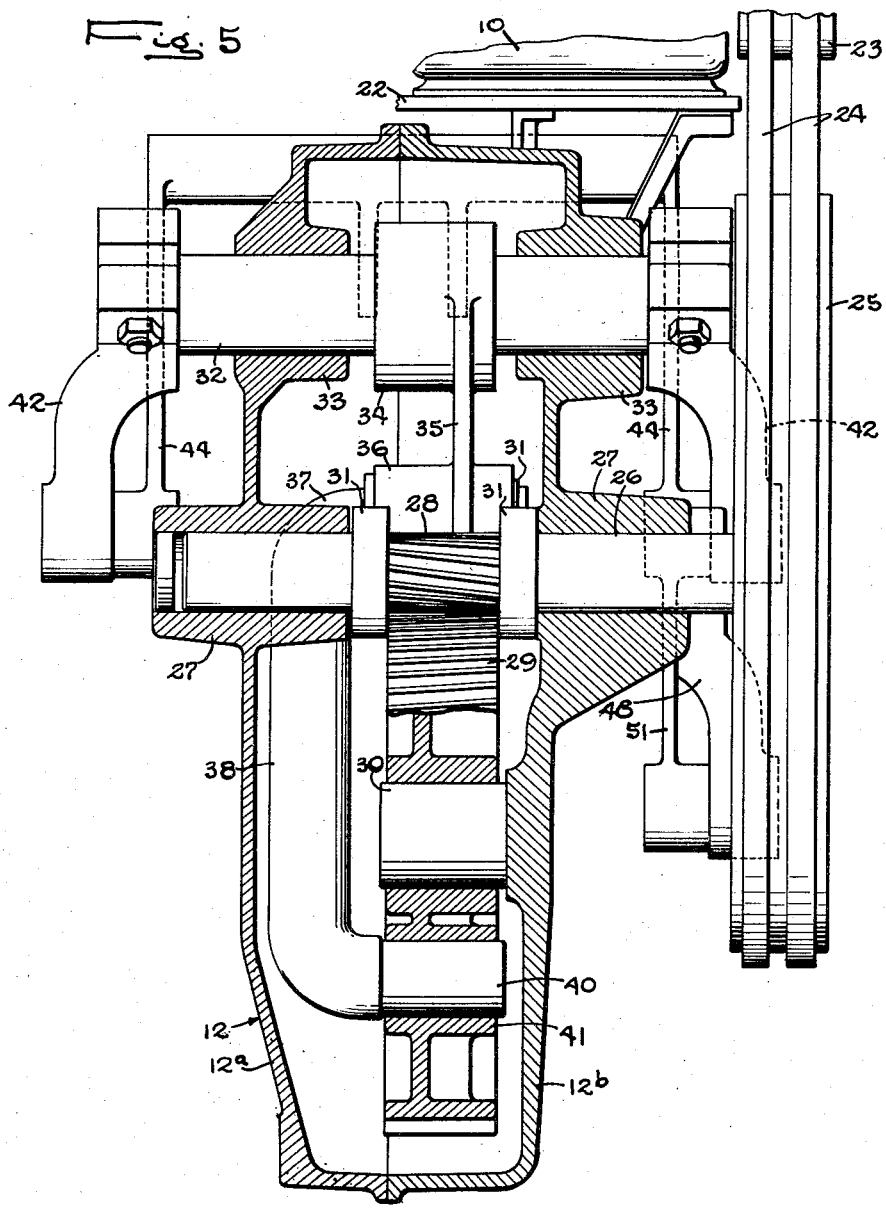

Patented Apr. 17, 1951

2,549,562

UNITED STATES PATENT OFFICE 2,549,562

POWER-DRIVEN OPERATOR

John Gordon Baker, Evansville, Wis., assignor to Baker Manufacturing Company, Evansville, Wis., a corporation of Wisconsin Application April 18, 1949, Serial No. 88,180

2 Claims. (Cl. 74—42)

This invention relates to motor driven reciprocating pumps and more particularly to pump operators of the type having reduction gearing and a motion converting mechanism disposed within a casing containing oil which is distributed automatically to the bearings and interengaging surfaces of the parts. In installations where the output member of such an operator is connected directly to an unguided pump rod, as distinguished from instances in which the pump frame provides the guide, the connection between the operator and the pump rod must be mounted to slide in suitable guide surfaces or otherwise held in a straight path. In such cases, it has been the practice heretofore to mount the guiding elements within the oil casing which not only necessitates a substantial enlargement of the casing, but also precludes effective sealing of the latter.

The primary object of the present invention is to overcome the foregoing objections and effectually seal the operator casing by dividing the oscillating and rotary parts of the operator in a novel manner and locating outside of the oil casing those parts which do not require automatic lubrication.

A more detailed object is to mount the rocker arm externally of the gear case and guide the pump rod in a truly rectilinear path through the use of an auxiliary rocker arm also mounted on the gear externally thereof.

The invention also resides in the novel construction and arrangement of the externally mounted parts.

Other objects and advantages of the invention will become apparent from the following detailed description taken in connection with the accompanying drawings, in which:

Figure 1 is a side elevational view of a pump operator embodying the novel features of the present invention, the operator being mounted on a pump casing.

Fig. 2 is a fragmentary elevational view looking from the right in Fig. 1.

Fig. 3 is a perspective view of the link connection between the operator and the pump rod.

Fig. 4 is a section taken along the line 4—4 of Fig. 2.

Fig. 5 is a section taken along the line 5—5 of Fig. 4.

For purposes of illustration, the invention is shown in the drawings incorporated in an operator driven by an electric or other kind of motor 10 for reciprocating a pump rod 11 which is unguided and projects upwardly beyond the upper end of a casing or tube 13 on which the operator casing 12 is mounted rigidly. Herein, an apertured connector head threaded onto the upper end of the pump rod 11 is formed with a depending cap 15 which fits over and telescopes with a tubular extension 16 on a cover 17 closing the well casing.

The operator casing 12 is of oblong shape and relatively flat, and is composed of two dished castings 12ª and 12ᵇ which are flanged at their open ends and clamped together by bolts 18. To mount the casing directly on the pump tube 13, the lower end portion is clamped by the lowermost bolts 18 to the top edges of triangular plates 19, the vertical edges of which extend down along the pump tube 13 and are clamped detachably as by bolts 21 to lugs 20 projecting outwardly from the tube at vertically spaced points. By removing the uppermost bolt 21 and disconnecting the pump rod from the operator, the latter may be swung into an out of the way position as shown in phantom in Fig. 1.

The motor 10 is mounted on a pad 22 on the top of the casing 12, and its shaft carries a pulley 23 connected by belts 24 to a larger pulley 25 which is fast on the outer end of a shaft 26. The latter projects horizontally through the casing 12 and is journaled at opposite ends in bearing bosses 27 formed in the side walls of the casing adjacent the vertical edge thereof remote from the pump rod. Intermediate its ends, the shaft carries a pinion 28 meshing with teeth on the periphery of a larger gear 29 disposed below the drive shaft and journaled on a parallel stud 30 projecting inwardly from the casing part 12ᵇ about midway between the casing edges. The components of the speed reduction gearing thus formed are held in a common plane, this being accomplished herein by collars 31 fast on the shaft 26 between opposite ends of the pinion and the adjacent ends of the bearing bosses 27.

Rotary motion of the gear 29 is converted into oscillatory motion of a shaft 32 which is disposed above and parallel to the drive shaft 26 with its opposite end portions projecting outwardly through and journaled in bearing bosses 33 integral with the casing parts. Fast on the driven shaft within the casing is the hub 34 of a rocker arm or web 35 which is disposed substantially in the plane of the gear 29. At its free end, the arm is formed with a sleeve 36 in which is journaled one leg 37 of a C-shaped pitman 38 whose intermediate straight portion lies alongside the gear 29 between the latter and the casing wall 12ª. The leg 37 may be held against endwise movement in the sleeve by a snap ring 31 or the like (Fig. 5). The other or lower leg 40 of the pitman is journaled in a crank bearing 41 disposed eccentrically in the gear 29, the pitman end being in this instance free to slide endwise in its bearing. It will be seen that as the gear rotates, the arm 35 and therefore the shaft 32 will be rocked back and forth through an angle determined by the throw of the crank and the length of the arm.

In accordance with the present invention, a connection disposed outside of the operator casing and composed entirely of oscillating and pivotally connected parts is utilized to convert the oscillatory motion of the shaft 32 into straight line reciprocation of the pump rod 11 and this without necessitating the use of sliding guides or other elements difficult to lubricate or protect. The motion transmitting elements of the connection comprise arms 42 clamped or otherwise made fast on the outwardly projecting ends of the shaft 32 and projecting horizontally beyond the edge of the operator casing to points spaced above the upper end of the well casing. The arms are positioned angularly on the shaft so as to swing through substantially equal arcs above and below the horizontal to limit positions shown in full and in phantom in Fig. 1. At their free ends, the arms are joined by pins 43 to depending legs 44 of an inverted U-shaped yoke 45 which straddles the upper end of the pump rod 11 and forms a link connection between the latter and the rocker arms 42. The connection is completed by a pin 46 projecting through the apertured head 14 on the pump rod to join the head pivotally to spaced lugs 47 depending from the closed end of the yoke and straddling the head. The arrangement is such that when the rocker arms 42 are disposed in horizontal position, the pins 43 will intersect the axis of the pump rod.

Guiding of the pump rod in a true rectilinear path is effected by an auxiliary rocker arm 48 pivoted on the operator casing 12 and acting on the yoke link 45 to rock the latter about the pivot pins 43 and compensate for the foreshortening of the arms 42 as the latter swing away from the horizontal. The guide arm 48 is mounted to swing in the plane of the adjacent rocker arm 42, and one end thereof is pivoted on a stud 49 cast integral with the casing part 12<sup>b</sup> and projecting outwardly therefrom parallel to the rockshaft 32. The other end of the arm 48 is connected by a pivot pin 50 to the lower end of a rigid extension 51 of one of the yoke arms 44. The auxiliary arm 48, which is somewhat shorter than the arms 42 in this instance, is rocked up and down substantially equal distances from the horizontal between the limit positions shown in full outline and in phantom in Fig. 1. In the movement of the auxiliary arm in either direction away from the horizontal, the lower end of the yoke link 45 is moved toward the operator casing and about the pivot 43 to correspondingly incline the parts 44 of the link. The amount of such swinging of the link is just sufficient to offset the movement of the pivot 46 which would otherwise be produced by the horizontal shifting of the fulcrum pivot 43 due to the arcuate movement of the latter. In other words, the position of the pivot 50 and the lengths of the arm 48 and the yoke parts 44 and 51 are correlated with the length of range of movement of the arms 42 so as to insure movement of the pivot 46 in a straight line.

In operation, oscillation of the rocker arms 42 upwardly and downwardly results in raising and lowering of the pump rod between the lower position shown in full in Fig. 1 and the upper position shown in phantom. The guide arm 48 is similarly rocked by virtue of its connection with the adjacent arm 42 and acts to rock the link 45 about the pivot 43 as a fulcrum, thus compensating for the foreshortening of the arms 42 thus causing the axis of the pump rod pivot 46 to reciprocate in a single plane.

It will be noted that all of the motion transmitting parts which are disposed externally of the operator casing 12 are connected together and to the pump rod at pivot joints which are easily sealed against dirt and easily lubricated more or less permanently. Thus, only the parts of the speed reducing and motion converting mechanisms need be mounted within the casing which, therefore, may be made of minimum size. Moreover, by separating the motion converting mechanism at the oscillating shaft 32, the casing is sealed effectually against the escape of lubricating oil, and the entry of water or foreign matter into the casing is prevented. Therefore, through the use of the present invention, greater simplicity and compactness in the arrangement of the operator parts has been achieved, and the service life of the operator has been prolonged without the necessity of more frequent lubrication of the exposed parts.

This application is a continuation-in-part of my copending application Serial No. 33,639, filed June 17, 1948, now abandoned.

I claim as my invention:

1. In a motion converting mechanism, the combination of, a casing, a rockshaft projecting outwardly through a wall of said casing and journaled therein, power rotated means within said casing coupled to said shaft for rocking the same back and forth, an arm fast on said shaft outside of said casing, a lever fulcrumed intermediate its ends on the free end of said arm to swing about an axis paralleling said shaft, means at one end of said lever for connecting the latter to a part to be reciprocated in a straight line, a rigid link shorter than said arm and pivotally connected at one end to the other end of said lever, and means rigid with said casing wall providing a pivot supporting the other end of said link to swing about an axis paralleling said rockshaft and disposed between the latter and said straight line, the length of said link being correlated with the arm and lever to maintain said connecting means on said straight line during rocking of said shaft.

2. In a motion converting mechanism, the combination of, a casing adapted to contain a lubricant, a rockshaft projecting outwardly through a wall of said casing and journaled therein, power rotated means within said casing coupled to the inner portion of said shaft and operable to rock the same back and forth, an arm fast on said shaft outside of said casing, a lever fulcrumed intermediate its ends on the free end of said arm to swing about an axis paralleling said shaft, means at one end of said lever for connecting the latter to a part to be reciprocated in a straight line, a rigid link pivotally connected at one end to the other end of said lever and projecting from the lever toward said rockshaft in at least one position of the latter, and means rigid with said casing wall providing a pivot supporting the other end of said link to swing about an axis paralleling said rockshaft, the length of said link being correlated with the arm and lever to maintain said connecting means on said straight line during rocking of said shaft.

JOHN GORDON BAKER.

REFERENCES CITED

The following references are of record in the file of this patent:

UNITED STATES PATENTS

| Number | Name | Date |
|---|---|---|
| 1,164,455 | Blackaller | Dec. 14, 1915 |
| 1,470,634 | Myers | Oct. 16, 1923 |
| 1,576,208 | Myers | Mar. 9, 1926 |